United States Patent
Naveh et al.

(10) Patent No.: US 9,866,587 B2
(45) Date of Patent: Jan. 9, 2018

(54) IDENTIFYING SUSPICIOUS ACTIVITY IN A LOAD TEST

(71) Applicant: HEWLETT PACKARD ENTERPRISE DEVELOPMENT LP, Houston, TX (US)

(72) Inventors: Yaron Naveh, Yehud (IL); Ofer Eliassaf, Yehud (IL); Gil Zieder, Yehud (IL)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 29 days.

(21) Appl. No.: 15/115,004

(22) PCT Filed: Apr. 9, 2014

(86) PCT No.: PCT/US2014/033426
§ 371 (c)(1),
(2) Date: Jul. 28, 2016

(87) PCT Pub. No.: WO2015/156788
PCT Pub. Date: Oct. 15, 2015

(65) Prior Publication Data
US 2016/0352775 A1 Dec. 1, 2016

(51) Int. Cl.
H04L 29/06 (2006.01)
H04L 12/22 (2006.01)
H04L 12/26 (2006.01)
H04L 29/08 (2006.01)

(52) U.S. Cl.
CPC .......... *H04L 63/1458* (2013.01); *H04L 12/22* (2013.01); *H04L 43/00* (2013.01); *H04L 43/50* (2013.01); *H04L 63/08* (2013.01); *H04L 63/1433* (2013.01); *H04L 67/02* (2013.01); *H04L 67/10* (2013.01)

(58) Field of Classification Search
CPC . H04L 63/08; H04L 63/1433; H04L 63/1458; H04L 67/02; H04L 67/10
USPC ........................................................... 726/25
See application file for complete search history.

(56) References Cited

U.S. PATENT DOCUMENTS

| 8,412,605 | B2 | 4/2013 | Griffin et al. |
| 8,677,489 | B2 | 3/2014 | Strebe et al. |
| 2008/0235370 | A1 | 9/2008 | Choi et al. |
| 2009/0287791 | A1 | 11/2009 | Mackey |
| 2010/0122342 | A1 | 5/2010 | El-Moussa et al. |
| 2011/0103391 | A1* | 5/2011 | Davis ...................... H04L 45/60 370/400 |
| 2013/0254872 | A1 | 9/2013 | Lawson et al. |

(Continued)

FOREIGN PATENT DOCUMENTS

EP 2161898 A1 3/2010

OTHER PUBLICATIONS

Gorski, B., "Don't Be Denied: Why SMBs Should Consider Denial-of-service Vulnerability Testing," (Web Page), Jan. 23, 2012, 3 pages, available at http://www.pivotpointsecurity.com/techno/denial-of-service-vulnerability-testing-for-smbs.

(Continued)

*Primary Examiner* — Haresh N Patel

(57) ABSTRACT

Identifying suspicious activity in utilizing a load testing service can include establishing an amount of domain calls to a domain, modifying the amount, and blocking domain calls exceeding the amount.

15 Claims, 4 Drawing Sheets

(56) References Cited

U.S. PATENT DOCUMENTS

| | | | | |
|---|---|---|---|---|
| 2014/0280931 | A1* | 9/2014 | Braun | H04L 63/10 709/225 |
| 2014/0280932 | A1* | 9/2014 | Braun | H04L 63/10 709/225 |
| 2015/0326475 | A1* | 11/2015 | CJ | H04L 61/103 370/392 |
| 2015/0332372 | A1* | 11/2015 | Hariri | G06F 17/30867 705/26.7 |
| 2017/0195410 | A1* | 7/2017 | Sebbah | H04L 67/1023 709/224 |
| 2017/0212809 | A1* | 7/2017 | Sebbah | G06F 11/1464 709/223 |

OTHER PUBLICATIONS

International Search Report & Written Opinion received in PCT Application No. PCT/US2014/033426, dated Dec. 17, 2014, 12 pages.

Mailloux, M. et al., "Application Layer and Operating System Collaboration to Improve QoS against DDoS Attack," (Research Paper), May 5, 2008, 10 pages, available at https://wiki.engr.illinois.edu/download/attachments/68780072/QoSSoD.pdf?version=2.

Priority One Security, "DDOS Testing," (Web Page), 2013, 4 pages, available at http://www.p1sec.com/corp/consulting/ddos-testing/.

* cited by examiner

IDENTIFYING SUSPICIOUS ACTIVITY IN A LOAD TEST

BACKGROUND

Cyber attacks are offensive maneuvers employed by individuals or whole organizations that can target networks, servers, websites, email accounts, and various other targets. Cyber attacks have become increasingly common and costly to businesses and individuals. Load testing solutions can be employed to carry out a cyber attack. For example, an attacker may use multiple computers and/or provisioned cloud assets associated with a load testing service (e.g., load testing Software as a Service (SaaS)) to generate a load on a target in an attempt to overload the target (e.g., carry out a Denial-of-Service (DoS) attack).

DETAILED DESCRIPTION

Figure 1:
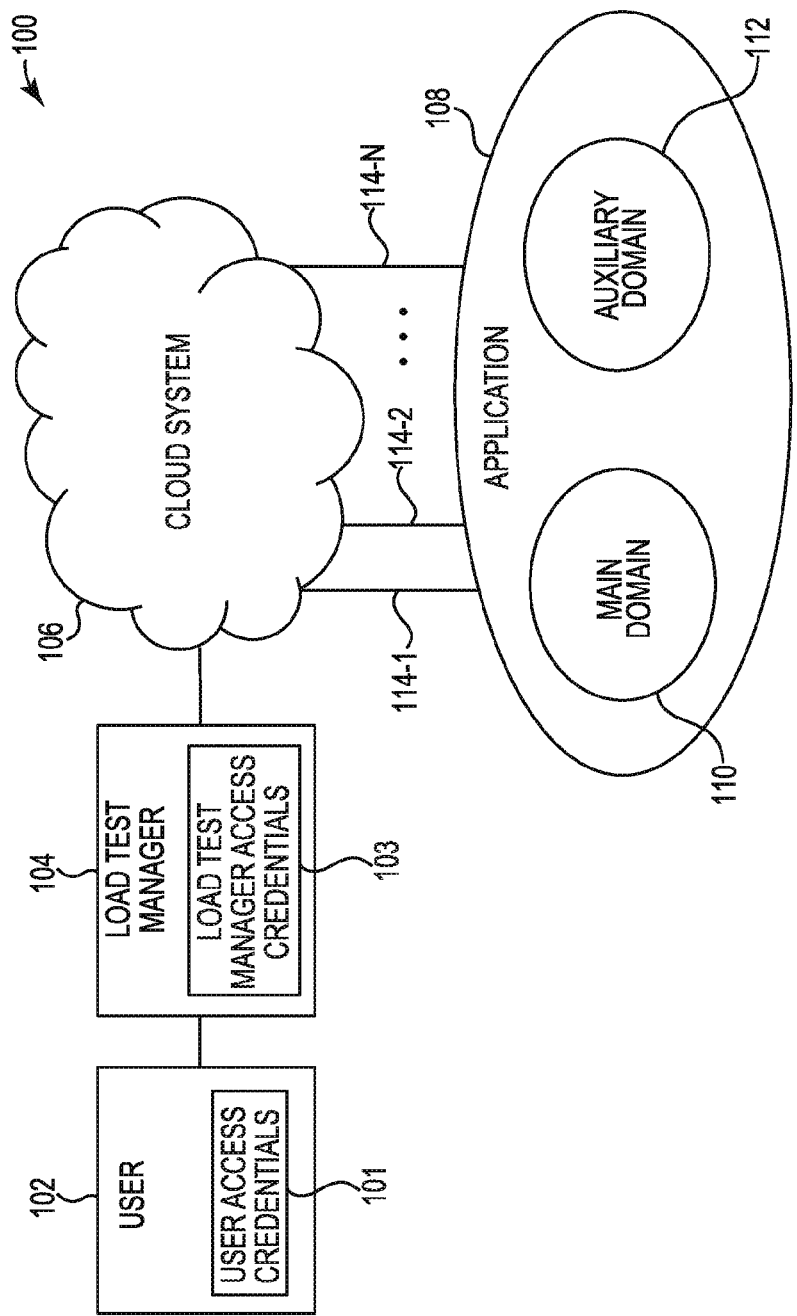
FIG. 1 illustrates an example environment for identifying suspicious activity in utilizing a load testing service according to the present disclosure.

Load testing can involve testing how an application (e.g., a program, a group of programs, a web site, a server, an email account, etc.) performs under a load. A load can be a volume of requests. The requests can be network calls to a particular domain associated with an application, such as a number of network calls to a particular server of a web site in order to send the server data or request to receive data from the server.

Load testing can allow for testing of a traffic-heavy application (e.g., a web search engine, a news provider's website, etc.) and/or testing an application under a large traffic event (e.g., "Black Friday" for an online retailer's online shopping application). Testing various applications can allow an application affiliate (e.g., application owner, application manager, application administrator, third party application testing service, and/or anyone with permissions to test an application) to validate that a given application can continue to function under various loads/load spikes and can provide important information in planning for additional resources (e.g., additional servers that may need to be brought on line to handle a rapid increase in popularity of the application due to, for example, a popular web site linking to the application).

Additionally, load testing can used to simulate a cyber attack as part of a security audit for an application. For example, load testing can simulate a distributed denial of service (DoS) attack. A DoS attack is a class of cyber attack initiated by an individual or group that can disrupt the services of applications by overloading a processing capacity of the application and/or its associated information systems and consuming network bandwidth associated with the application. Load testing an application can provide an assessment of the application's performance under increased loads similar to loads that might accompany an attempted DoS attack.

A load testing tool can be utilized in executing a load test. A load testing tool can include a desktop tool (e.g., computer software stored fully or partially on a user's computing device, server, workstation, etc.) that applies the load in a load test run. Additionally, a load testing tool can include a desktop tool with a cloudburst feature that can provision resources from a private cloud or data center and can burst-provision public cloud resources to increase the load of the test. Generally, load testing tools can execute instructions, cause instructions to be executed, and/or generate instructions for execution, wherein the instructions cause a volume of network calls to a particular domain associated with an application.

The capability of load testing tools to generate a volume of network calls and to simulate a cyber attack can be misappropriated by individuals and/or groups seeking to launch a real cyber attack. For example, load testing tools can be utilized by a load testing tool user to generate a DoS attack against a targeted application by employing the load testing tool resources to overload the processing capacity of the application. Securing load testing tools against this type of misuse often entails the use of non-scalable and highly restrictive measures including requiring a verification of every user of the load testing tool and requiring a user to create individual accounts and negotiate special permissions with cloud resource providers.

In contrast, the embodiments of the present disclosure describe a load testing service (e.g., full software as a service (SaaS) load testing tools) that includes the ability to identify suspicious activity while incorporating scalable security controls for the load testing service.

FIG. 1 illustrates an example environment 100 for identifying suspicious activity in utilizing a load testing service (e.g., load testing software as a service (SAAS)) according to the present disclosure. The environment 100 is shown to include a user 102 (e.g., computing device, server, workstation, etc.), a load test manager 104, a cloud system 106, an application 108 including a main domain 110 and an auxiliary domain 112, and domain calls 114-1 . . . 114-N to the main and/or auxiliary domains, 110 and 112, associated with the application 108.

A user 102 can include an account associated with any entity requesting a load test of an application 108. The user 102 may be a single user or a plurality of users. The user 102 can be an application affiliate or an unaffiliated entity requesting a load test on behalf of himself and/or on behalf of a third party. The user 102 can further include a number of user computing devices. The user computing devices can be associated with the user 102 and can be used to transmit/receive data related to a load test request. For example, a user computing device can be used to transmit a load test request to a load test manager 104 to utilize a load testing SaaS application.

A load test manager 104 can include a provider of the load testing SaaS. A load test manager 104 can include an entity that provides on-demand load testing SaaS based on a particular fee structure (e.g., a subscription schedule). For example, a load test manager 104 can include a vendor and/or service provider that hosts a load test SaaS application for use by the user 102. The load test manager 104 can include the load test SaaS application itself. For example, the load test manager 104 can include instructions and/or commands for utilizing computational resources to perform a load test of an application 108.

The cloud system 106 can include computational resources available for use by the load test SaaS application. The cloud system 106 can include a public cloud system, a private cloud system, and/or a hybrid cloud system. For example, an environment (e.g., IT environment) including a public cloud system and a private cloud system can include a hybrid environment and/or a hybrid cloud system. A public cloud system can include a service provider that makes computational resources (e.g., applications, storage, virtual machines, and/or data), available to the public over the Internet. A public cloud system can be free or offered for a fee, for example.

A private cloud system can include computing architecture that provides hosted services to a limited number of people behind a firewall. For example, a private cloud can include an Enterprise Resource Planning (ERP) system, a number of databases, and virtualization (e.g., virtual machines). For instance, a private cloud system can include a computing architecture that provides hosted services to a limited number of a plurality of nodes (e.g., computers) behind a firewall. The ERP, for example, can integrate internal and external management information across an entire load test SaaS application, enterprise, and/or organization. A number of databases can include an event database, event archive, configuration management database (CMDB), and/or a user profile/user history database, for example. Virtualization, for example, can include the creation of a number of virtual resources that are allocated from physical resources but not directly limited by the capabilities of particular physical resources. Examples of virtualized resources include hardware platforms, operating systems, storage devices, and/or network resources, among others. For example, a virtual storage device can provide up to a particular capacity of storage that is physically provided by one, less than one, or more than one physical storage device depending on the amount of storage space allocated to the virtual storage device and therefore not directly limited by the capabilities of any particular device(s). The public cloud system and the private cloud system can be bound together, for example, through the application in the public cloud system and the ERP in the private cloud system.

A hybrid cloud, for example, can include a mix of traditional server systems, private cloud systems, public cloud systems, and/or dynamic cloud services. For instance, a hybrid cloud can involve interdependencies between physically and logically separated services consisting of multiple systems. A hybrid cloud, for example, can include a number of clouds (e.g., two clouds) that can remain unique entities but can be bound together.

The computational resources of the cloud system 106 can be provisioned by the load test manager 104 to execute a load test of an application 108. For example, a load test manager 104 can communicate instructions/commands to the cloud system 106 to cause the computational resources of the cloud system 106 to, for example, place a load (e.g., a number of domain calls 114-1 . . . 114-N) on an application 108.

The load test manager 104 can include load test manager access credentials 103 to access the cloud system 106. For example, the load test manager 104 can include load test manager access credentials 103 unique to the load test manager 104 that allow the load test manager 104 to access and/or provision the computational resources of the cloud system 106. The computational resources of the cloud system 106 provisioned using the load test manager access credentials 103 can be used to execute a load test requested by a user 102. However, the load test manager access credentials 103 themselves are not necessarily shared with the user 102. In this manner, the user 102 is able to instruct utilization of the provisioned computational resources of the cloud system 106 without direct access to and/or knowledge of the load test manager access credentials 103.

In example embodiments, the cloud system 106 can include a number of distinct cloud services (e.g., cloud resources from a number of providers). Each of the distinct cloud resources may require distinct access credentials (e.g., load test manager access credentials 103) before allowing the load test manager 104 to provision said resources. The user 102 can register with the load test manager 104. For example, the user 102, upon registration, can access a web site associated with the load test manager 104, the web site acting as a portal for the user 102 to pay for use of the load test SaaS application of the load test manager 104. The registration can include establishing user access credentials 101 (e.g., credentials granting access to the load test manager 104) responsive to receiving payment for use of the load test SaaS application. The user access credentials 101 can, upon authentication, grant the user 102 access to the load test manager 104 and the associated load test SaaS application. While user access credentials 101 grant the user 102 accesses to the load test manager 104, they may not grant the user 102 direct access to the cloud system 106.

Since the load test manager 104 includes load test manager access credentials 103 to access and/or provision the computational resources of each cloud system 106, the user 102 does not have to acquire their own set of credentials to access and/or provision the computational resources of the cloud system 106. In this manner, the load test manager 103 retains control over access to each cloud system 106 from which they will provision computation resources to execute the requested load test. The user 102 receives de facto access to the cloud system 106 through his access to the load test manager 104 without having direct access to and/or knowledge of the load test manager access credentials 103. Not only does this protect the load test manager access credentials 103 from abuse by the user 102, but it also saves the user 102 from the additional effort/cost associated with finding suitable cloud systems 106, acquiring user access credentials 101 to the cloud systems 106, sharing user access credentials 101 with the load test manager 104, and/or processing multiple invoices associated with use of the load test SaaS application and the use of the cloud system 106 computation resources. However, where the cloud system 106 is strictly a private cloud (e.g., not a public cloud and not a hybrid cloud) the user 102 can establish/utilize a separate set of user-specific cloud credentials (not illustrated) to access the cloud system 106. The user-specific cloud credentials can be used rather than the load test manager access credentials 103 to access the cloud system 106 in such embodiments.

The application 108 can include any application (e.g., a program, a group of programs, a web site, a server, an email account, etc.) under test (e.g., the subject of a load test request from the user 102 to the load test manager 104, an application 108 that is actively being tested by the load test SaaS application, etc.). For example, the application 108 can be a web site and/or a web service of which the user 102 is an affiliate. The application 108 can be, for example, a website that delivers news content and the user 102 can be an IT administrator working for a parent company owner of the web site.

The application 108 can include a number of domains 110, 112. The number of domains 110, 112 can be distinct portions of the application 108. Each of the number of domains 110, 112 can be associated with a unique identification (e.g., domain name, Uniform Resource Locator (URL), and/or any type of identifier). For example, the number of domains 110, 112 can be portions of data appearing on a web site and/or a web service application that are served from distinct URLs. Each of number of domains 110,112 can be classified as a main domain 110 or an auxiliary domain 112.

A main domain 110 of the application 108 under test can include the core domain (e.g., a home page, a most common called domain, a domain associated with the main content of the application 108, etc.) associated with the application 108. For example, the main domain 110 of an application 108 including a web site that delivers news content can be the URL that is associated with the home page of the web site.

The auxiliary domain 112 of the application 108 under test can include a domain (e.g., advertisements, content served separately from the main domain, javascripts, etc.) other than the main domain 110. Auxiliary domains 112 of an application 108 under test including a web site can include domains that are called by browsers for access to javascripts and/or images associated with the web site. For example, the main domain 110 of a web site (in this example the application 108 under test) that delivers news content may be the URL that is associated with the home page of the web site, while the auxiliary domain 112 can include html, images, javascripts, and other resources which are fed in from separate domains to be displayed on the home page of the web site. A provider serving the main domain 110 URL that is associated with the home page of the web site can have a business relationship with the provider serving the auxiliary domain 112. For example, the provider serving the auxiliary domain 112 may be able to host content very efficiently. Accordingly, the provider serving the main domain 110 of the web site can have data hosted by auxiliary domain 112 based on a business agreement rather than consume main domain 110 resources. Alternatively, the provider serving the auxiliary domain 112 can be the same provider serving a main domain 110. In such an alternative, the auxiliary domain 112 can have a distinct identifier. For example, the auxiliary domain 112 can be delivered by a first server and the main domain 110 by a second server, each having a distinct URL associated with the distinct server.

The load test manager 104 can receive payment and/or a request from a user 102 to utilize the load test SaaS to perform a load test of an application 108. The request can include an identification of the application 108 to be tested. The identification can include a specific identification of a main domain 110 and/or an auxiliary domain 112 of the application 108 to be tested. Accordingly, the load test manager 104 can identify the main domain 110 and/or an auxiliary domain 112 of the application 108 based on the identification from the user 102.

Alternatively, the identification can identify a number of domains 110, 112 of the application 108 to be tested without specifying each as a main domain 110 and/or an auxiliary domain 112. Accordingly, the load test manager 104 can identify the main domain 110 and/or an auxiliary domain 112 of the application 108 without a specific identification from a user 102. The load test manger 104 can identify the main domain 110 and/or an auxiliary domain 112 of the application 108 via a static analysis of a load test plan included in the load test request from the user 102 and/or a dynamic analysis of domain calls 114-1 . . . 114-N to the number of domains 110,112 during the runtime of the requested load test.

In some virtual user script styles (e.g., transport), there can be no use of an auxiliary domain 112, but the rest of the algorithm executed by the load test manager 104 can still apply. Therefore, the requested test methodology may not include calling an auxiliary domain 112 of the application 108. In such examples, only a main domain 110 may be identified or no particular domain may be identified and the application 108 itself may be treated as a main domain 110 for the purposes of the load test. However, in some script styles (e.g., browser and/or User Interface (UI) level testing) there can be use of a number of auxiliary domains 112 since they host scripts that can be used for correlation of the auxiliary domain 112 to the application 108.

The load test request from the user 102 to the load test manager 104 can include a load test plan. The load test plan can include a script defining a series of actions to be executed during a load test. For example, the script can include a number of steps that, when executed by the load test SaaS application, will apply a load to the number of domains 110, 112 of an application 108 (e.g., utilize a browser to place domain calls 114-1 . . . 114-N requesting to send and receive data to/from the number of domains 110,112 of the application 108). The number of steps can include, for example: 1) navigate to the URL that is associated with the home page of a website associated with the application 108 under test; 2) select an advertisement banner appearing on the home page; 3) select a search button appearing on the home page, etc.

The load test manager 104 can execute the load test plan and/or cause the load test plan to be executed. Executing the load test plan can include utilizing computational resources associated with the load test manager 104 including computational resources provisioned from the cloud system 106 to execute the script provided by the user 102. For example, the load test manager 104 can cause a number of computational resources to place a number of domain calls 114-1 . . . 114-N to particular domains 110, 112 of an application 108 under test.

The load test manager 104 can scale the amount of domain calls 114-1 . . . 114-N up to the number of computational resources they have access to. In this manner, the load test manager 104 is able to generate a wide variety of loads (e.g., volume of domain calls 114-1 . . . 114-N) on an application 108 during a load test. Moreover the load test manager 104 can control the amount of domain calls 114-1 . . . 114-N to a particular domain 110,112 of an application 108 under test. While the user 102 may request a particular amount of domain calls 114-1 . . . 114-N to a particular domain 110, 112 of an application 108 under test, the load test manager 104 can execute instructions based on input received to determine (e.g., cap) the amount of domain calls 114-1 . . . 114-N that will actually be executed.

The load test manager 104 can establish a user specific cap and/or a global cap. The user specific cap can cap the amount of domain calls 114-1 . . . 114-N permitted to a specific domain 110, 112 of an application 108 under test by a specific user 102 of the load test SaaS over a period of time.

The user specific cap can be based on characteristics of the user 102. For example, the characteristics of the user 102 can include whether the user 102 has verified their identity. The user 102 may have verified their identity upon registering with the load test manager 104 or in previous load test runs with the load test manager 104. Verifying the user identity can include confirming that the entity submitting the request is who they claim to be and authorizing the identity with respect to a level of permissions (e.g., an amount of domain calls 114-1 . . . 114-N permitted to a specific domain 110, 112 of an application 108 under test over a period of time) to the load test SaaS. For example, a representative affiliated with the load test manager can place a call to the user and verify the user's 102 identity. Verifying the user identity can further include verifying the identity of the user via various forms of identification (e.g., driver license, government identification, passport, credit card, social security number, etc.). Verifying the user identity can also include a verified user 102 vouching for the identity of an unverified user 102. Since verification of the user identity is not required upon registration with the load test manager 104, the load test manager 104 can provide load test SaaS application access to both users that have been verified and users that have not been verified. Establishing the user specific cap based on whether the user 102 has verified their identity can therefore include establishing a greater cap (e.g., the ability to place a higher amount of domain calls 114-1 . . . 114-N) to a user 102 that has verified their identity relative to a user 102 that has not verified their identity.

The characteristics of the user 102 can further include an account history associated with the user 102. For example, the load test manager 104 can monitor user 102 behavior during utilization of the load test SaaS. The user behavior can be cataloged as an account history associated with the user 102. The load test manager 104 can reference the cataloged account history of behavior associated with a particular user 102 and base the cap amount on the account history. For example, the load test manager 104 can establish a relatively lesser cap (the ability to place a lower amount of domain calls 114-1 . . . 114-N) of a number of domain calls permitted by a first user 102 to a specific domain 110, 112 of an application 108 under test over a period of time versus a second user based on the account history associated with the first user 102 including suspicious activity (e.g., the first user 102 having requested an amount of domain calls 114-1 . . . 114-N in excess of a user specific cap and/or global cap associated with a previous load test run of the load test SaaS application) not present in the account history of the second user. In another example, where the account history associated with the first user 102 includes a previous load test run without any suspicious activity, the load test manager 104 can establish a relatively greater cap of a number of domain calls 114-1 . . . 114-N permitted by the first user 102 to a specific domain 110,112 of an application 108 under test over a period of time versus a second user who either has an account history including suspicious activity or has an account history with fewer previous load test runs without any suspicious activity.

The characteristics of the user 102 can also include whether the user 102 has verified their permissions with respect to the application 108 under test. A user 102 can verify their permissions upon registration with the load test manager 104 or in previous load test runs with the load test manager 104. The user 102 can verify a specific domain 110,112 of an application 108 under test by placing a token (e.g., a globally unique identifier (GUID)) specified by the load test manager 104 in the main domain 110 root of an application 108 to be load tested. The load test manager 104 can confirm that the token was placed by analyzing the main domain 110 of the application 108 for the token. By placing the token the user 102 can verified their permissions with respect to the application 108 since it can be assumed that only a user 102 with the proper permissions would be able to place the specified token in the main domain 110 root of an application 108. The load test manager 104 can establish a relatively greater user specific cap of a number of domain calls 114-1 . . . 114-N permitted by a first user 102 to a specific domain 110, 112 of an application 108 under test over a period of time versus a second user based on the first user 102 verifying their permissions with respect to the application 108 as described above.

The global cap can be a cap of the amount of domain calls 114-1 . . . 114-N to a specific domain 110, 112 by a plurality of users of the load test SaaS application over a period of time. The load test manager 104 can provide the load test SaaS application to a plurality of users. The global cap can limit the amount of domain calls 114-1 . . . 114-N that the plurality of users can make to a specific domain 110,112 of an application 108. For example, a specific domain 110,112 of an application 108 can be limited to an established global cap of ten thousand calls per day total regardless of which user 102 of the load test SaaS application is requesting the calls and/or the user specific cap associated with the requesting user 102. By establishing a global cap the load test manager 104 can prevent a user 102 from abusing the load test Saas application provided by the load test manager 104. For example, the global cap can prevent abuse by a user 102 attempting a DoS attack by registering multiple user accounts with the load test manager 104 to artificially inflate the amount of domain calls 114-1 . . . 114-N that the user 102 can make to a specific domain 110,112 of an application 108 in hopes of amassing a sufficient domain call 114-1 . . . 114-N allotment to overwhelm a targeted application 108.

The global cap can be based on characteristics of the specific domain 110,112 of an application 108. The characteristics of the specific domain 110,112 can include whether the specific domain 110, 112 is a main domain 110 or an auxiliary domain 112 and the format of the web site that the specific domain 110, 112 is associated with. For example, if the specific domain 110,112 is a main domain 110 of an application 108, then a higher global cap can be established for it if the main domain 110 typically experiences a high volume of domain calls 114-1 . . . 114-N. Whereas, if the specific domain 110,112 is an auxiliary domain 112 of an application 108, then a lower global cap can be established for it if the auxiliary domain 110 typically experiences a lower volume of domain calls 114-1 . . . 114-N. Furthermore, If the web site associated with, for example, a main domain 110 is a URL of a popular search engine, then the global cap for that main domain 110 would be greater than the global cap for a main domain 110 a small internet retailer website since the popular search engine likely possess the resources to handle a larger amount of domain calls 114-1-114-N to their main domain 110 relative to the small internet retailer.

The load test manager 104 can track completed domain calls 114-1 . . . 114-N over a period of time. For example, the load test manager can track and catalog the completed domain calls 114-1 . . . 114-N to a specific domain 110,112 of an application 108 over time. The load test manager 104 can compare the amount of domain calls 114-1 . . . 114-N performed over the period of time to the established user specific cap of the amount of domain calls 114-1 . . . 114-N permitted to a specific domain 110,112 of an application 108 under test by a specific user 102 of the load test SaaS application over a period of time and/or the established global cap of the amount of domain calls 114-1 . . . 114-N permitted to a specific domain 110, 112 of an application 108 under test by a plurality of users of the load test SaaS application over a period of time. Based on this comparison the load test manager 104 can determine if a request for a domain call 114-1 . . . 114-N included in a user's 102 load test request, when combined with the amount of tracked domain calls 114-1 . . . 114-N, will exceed the established user specific cap and/or the global cap. If a requested domain call 114-1 . . . 114-N would exceed the established user specific cap and/or the established global cap then the request can be flagged as suspicious activity and/or be blocked from execution. That is, the load test manager 104 can prevent the script associated with the load test request from being executed when execution requires exceeding the established user specific cap and/or the established global cap. The load test manager 104 can return a message (e.g., an error message, an email, a telephone call, a warning, etc.) to the user 102. The message can inform the user 102 that a portion of their load test request was blocked from execution due to it violating the established user specific cap and/or the established global cap. The message can also include steps to remedy the situation including instructions on actions that the user 102 can take to modify the established user specific cap and/or the established global cap.

The load test manager 104 can modify the established user specific cap and/or the established global cap of the amount of domain calls 114-1 . . . 114-N to specific domains 110, 112. For example, the load test manager 104 can modify the user specific cap of the amount of domain calls 114-1 . . . 114-N to a specific domain 110, 112 by the specific user 102 over the period of time and/or modify the global cap of the amount of domain calls 114-1 . . . 114-N to a specific domain 110, 112 by the plurality of users 102 of the load test SAAS application over the period of time. The load test manager can modify the caps based on a number of characteristics which are periodically or continuously monitored.

The load test manager 104 can modify the user specific cap of the amount of domain calls 114-1 . . . 114-N to a specific domain 110, 112 by the specific user 102 over the period of time based on a verification of the specific user 102. For example, the load test manager 104 can verify the identity of the specific user 102. The identity of the specific user can be verified by, for example, by a telephone conversation with the user 102, verifying via forms of identification (e.g., driver license, government identification, passport, credit card, social security number, etc.), via a verified user vouching for the yet unverified user, etc. The load test manager 104 can increase the amount of domain calls 114-1 . . . 114-N to a specific domain 110, 112 by the specific user 102 over the period of time once the identity of the user 102 is verified.

In another example, the load test manager 104 can verify the permissions of the specific user 102 associated with the specific domain 110, 112. For example, the load test manager 104 can verify the permissions of the specific user 102 associated with a specific domain 110, 112 by contacting the administrator of the specific domain 110, 112 and confirming the user's 102 permissions and/or by challenging the user 102 to establish their permissions by verifying the specific domain 110, 112. For example, the user 102 can verify a specific domain 110,112 of an application 108 under test by placing a token (e.g., a specific GUID), specified by the load test manager 104, in the main domain 110 root. The load test manager 104 can confirm that the token was placed. The load test manager 104 can increase the amount of domain calls 114-1 . . . 114-N to a specific domain 110, 112 by the specific user 102 over the period of time once the permissions of the user 102 are verified.

The load test manager 104 can modify the global cap of the amount of domain calls 114-1 . . . 114-N to a specific domain 110, 112 by the plurality of users 102 of the load test SaaS application over the period of time based on a characteristic of the domain 110, 112. The characteristic of the domain 110, 112 can include the format of a web site associated with the specific domain 110, 112. If the main domain 110 of an application 108 under test is a URL of a popular search engine then the application load manager 104 can increase the global cap for that main domain 110 since the global domain for a URL of a popular search engine is likely supported by sufficient resources to handle a large amount of calls to their main domain 110. Alternatively, if the main domain 110 of an application 108 under test is a URL of a small internet retailer then the application load manager 104 can decrease the global cap for that main domain 110 since the main domain 110 for a URL of a small internet retailer is likely supported by insufficient resources to handle a large amount of calls to their domain.

In another example, the characteristic of the domain 110, 112 can include a load expectation for the application 108 under test. For example, if the application 108 under test was a popular search engine including a main domain 110 comprising a URL of the home page for the popular search engine and an auxiliary domain 112 comprising advertisements provided from a distinct server to the home page, then the application load manager 104 can increase the established global cap of the amount of domain calls 114-1 . . . 114-N to the specific domain 110, 112 by the plurality of users of the load test SAAS application over the period of time as an increased load can be expected for these domains 110, 112 as compared to similar domains of a small internet retailer web site.

The load test manager 104 can track a ratio of amount of domain calls 114-1 . . . 114-N to the main domain 110 by the specific user 102 over the period of time to an amount of domain calls 114-1 . . . 114-N to a particular auxiliary domain 112 of a number of auxiliary domains by the specific user 102 over the period of time. The load test manager 104 can also modify the user specific cap of the amount of domain calls 114-1 . . . 114-N to a specific domain 110, 112 by the specific user 102 over the period of time and/or the global cap of the amount of domain calls 114-1 . . . 114-N to a specific domain 110, 112 by the plurality of users 102 of the load test SaaS application over the period of time based on a tracked amount of domain calls 114-1 . . . 114-N to the main domain 110 by the specific user 102 over the period of time to a tracked amount of domain calls 114-1 . . . 114-N to the particular auxiliary domain 112 of the number of auxiliary domains by the specific user 102 over the period of time falling outside (e.g., exceeding, falling below, rapidly deviating from, etc.) of a particular ratio (e.g., a ratio, a range of ratios, a permissive rate of change from a ratio and/or a range of ratios, etc.).

The particular ratio can be a predetermined ratio that represents a ratio associated with a typical load test run and/or with an approved load test plan for the particular application 108 under test. For example, the predetermined ratio can be one main domain 110 call 114-1 to every five auxiliary domain 112 calls 114-N. The load test manager 104 can decrease the user specific cap of the amount of domain calls 114-1 . . . 114-N to a specific domain 110, 112 by the specific user 102 over the period of time and/or the global cap of the amount of domain calls 114-1 . . . 114-N to a specific domain 110, 112 by the plurality of users 102 of the load test SaaS application over the period of time if the tracked amount of domain calls 114-1 . . . 114-N to the main domain 110 by the specific user 102 over the period of time to a tracked amount of domain calls 114-1 . . . 114-N to the particular auxiliary domain 112 of the number of auxiliary domains by the specific user 102 over the period of time fall outside a particular ratio, since this can be an indication of suspicious activity (e.g., abuse of the load test SaaS application for user in a cyber attack).

The load test manager 104 can monitor and identify a domain call 114-1 . . . 114-N that exceeds at least one of the maximum amount (e.g., established cap and/or modified caps) of domain calls 114-1 . . . 114-N to the main domain 110 by the specific user 102 over a period of time, the maximum amount (e.g., established cap and/or modified caps) of domain calls 114-1 . . . 114-N to each of the number of auxiliary domains 112 by the specific user 102 over the period of time, the maximum amount (e.g., established cap and/or modified caps) of domain calls 114-1 . . . 114-N to the main domain 110 by the plurality of users of the load testing SAAS over the period of time, and the maximum amount of domain calls 114-1 . . . 114-N to each of the number of auxiliary domains 112 by the plurality of users of the load test SaaS application over the period of time as suspicious activity. The load test manager 104 can block the suspicious activity. That is, a domain call 114-1 . . . 114-N requested by a user 102 that would exceed any of the established caps and/or modified caps can be denied and/or the accompanying instructions can be blocked from execution.

Figure 2:
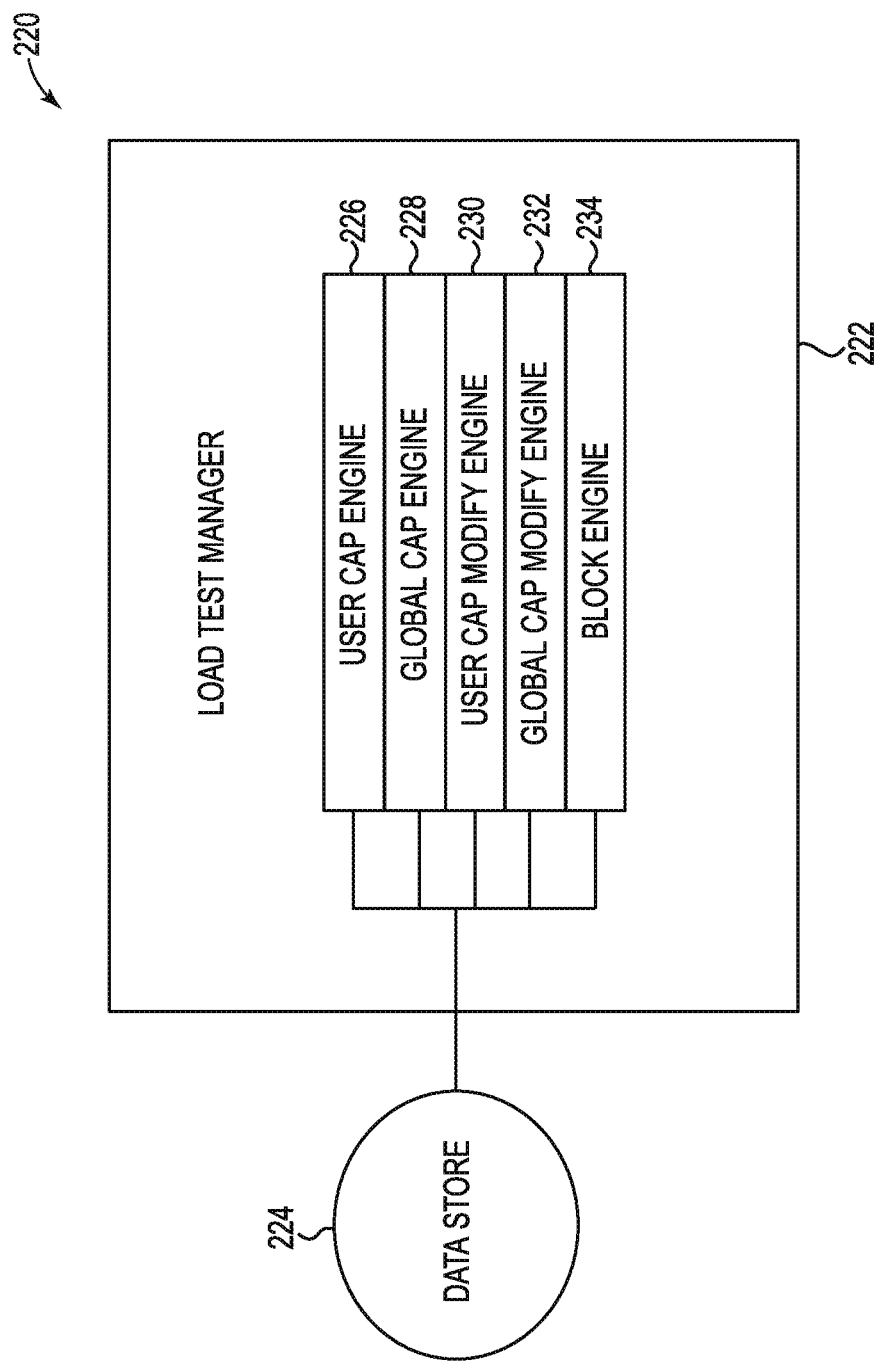
FIG. 2 illustrates a diagram of an example system for identifying suspicious activity in utilizing a load testing service according to the present disclosure.

FIG. 2 illustrates a diagram of an example system 220 for identifying suspicious activity in utilizing a load testing service (e.g., load testing software as a service (SAAS)) according to the present disclosure. The system 220 can include a data store 224, a load test manager 222, and/or a number of engines (e.g., the user cap engine 226, the global cap engine 228, user cap modify engine 230, global cap modify engine 232, and the block engine 234). The load test manager 222 can be in communication with the data store 224 via a communication link, and can include, manage, and/or employ the number of engines (e.g., the user cap engine 226, the global cap engine 228, user cap modify engine 230, global cap modify engine 232, and the block engine 234) to perform various functions. The load test manager 222 can include additional or fewer engines than illustrated to perform the various functions described herein.

The number of engines (e.g., the user cap engine 226, the global cap engine 228, user cap modify engine 230, global cap modify engine 232, and the block engine 234) can include hardware or a combination of hardware and programming to perform a number of functions described herein. For example, the user cap engine 226 can establish a cap of an amount of domain calls to a specific domain by a specific user of the load testing SAAS over a period of time. The global cap engine 228 can establish a cap of a number of domain calls to the specific domain by a plurality of users of the load testing SAAS over the period of time. The user cap modify engine 230 can modify the cap of the amount of domain calls to the specific domain by the specific user over the period of time based on a verification of the specific user. The global cap modify engine 232 can modify the cap of the amount of domain calls to the specific domain by the plurality of users of the load testing SAAS over the period of time based on a characteristic of the domain. The block engine 234 can block a domain call determined to exceed at least one of the modified cap of the amount of domain calls to the specific domain by the specific user over the period of time and the modified cap of the amount of domain calls to the specific domain by the plurality of users of the load testing SAAS over the period of time. The programming can include program instructions (e.g., software, firmware, etc.) stored in a memory resource (e.g., computer readable medium, machine readable medium, etc.) as well as hard-wired program (e.g., logic).

The user cap engine 226 can include hardware and/or a combination of hardware and programming to establish a user specific cap of an amount of domain calls to a specific domain by a specific user of the load test SaaS application over a period of time. The cap of an amount of domain calls can be a maximum amount of domain calls. The cap of an amount of domain calls can be established based on characteristics of the specific user. The specific user can include the entity that has submitted a request to a load test manager to perform a specific load test. The characteristics of the specific user can include whether the specific user has verified their identity. Establishing a cap of an amount of domain calls based on verifying the specific user's identity can include establishing a relatively greater user specific cap of the amount of domain calls to a specific domain by a specific user with a verified identity over the period of time versus another user who has not had their identity verified.

The characteristics of the specific user can additionally include an account history associated with the specific user. An account history can include a catalog of previous runs and events associated with the previous runs of the specific users. Establishing a cap of an amount of domain calls based on the account history associated with the specific user can include establishing a relatively lesser user specific cap of an amount of domain calls to the specific domain by the specific user over the period of time versus another user if the account history of the specific user includes suspicious activity in a previous load test run. Suspicious activity can include the specific user having requested an amount of domain calls in excess of the cap associated with the previous load test run. The established user specific cap can be tied to a predetermined scale wherein the incidences of suspicious activity in a specific user's account history are inversely correlated with the size of the user specific cap established for that user. Establishing a cap of an amount of domain calls based on the account history associated with the specific user can also include establishing a relatively greater user specific cap of the amount of domain calls to the specific domain by the specific user over the period of time versus another user if the account history of the specific user includes a previous load test run without any suspicious activity. Suspicious activity can include having requesting a number of domain calls in excess of a cap of an amount of domain calls to a specific domain by the specific user over a period of time associated with the previous load test run. The user specific cap can be based on a predetermined scale wherein the quantity of test runs without incidences of suspicious activity are correlated with the size of the cap.

The characteristics of the specific user can also include whether the user has verified their permissions with respect to the application under test. A user can have verified their permissions by placing a specified token (e.g., a globally unique identifier (GUID)) in an application root. For example, if the user requests a load test of a major news providing web site and the user had, upon a previous load test of the major news providing web site, placed a specific token and that placement was confirmed by the load test manager visiting the major news providing web site, then the users permission with respect to the major news providing web site can be considered verified. Establishing a user specific cap of an amount of domain calls based on verifying the specific user's permissions can include establishing a relatively greater user specific cap of the amount of domain calls to the specific domain by the specific user with verified permissions over the period of time versus another user who has not verified their permissions.

The specific domain can include a main domain and/or a number of auxiliary domains associated with the application under test. For example, the main domain can be a URL associated with a home page of a major news providing web site and the number of auxiliary domains can be URLs associated with various javascripts, images, and/or advertisements also appearing on the home page of the major news providing web site. Establishing a user specific cap of an amount of domain calls to each specific domain by a specific user can include limiting the maximum amount of domain calls that a specific user is permitted to execute and/or have executed on their behalf via the load test SaaS application.

The period of time can be scaled to meet any time frame associated with identifying and/or preventing a cyber attack on an application under test. The period of time can be based on characteristics of an application under test and/or characteristics of cyber attacks. For example, the period of time can be a period of time that is correlated to a particular time frame (e.g., seconds, minutes, hours, days, weeks, etc.) over which loads in excess of established caps are indicative of the load test SaaS application being improperly used to execute a cyber attack (e.g., a Denial of Service (DoS) attack). For example, if a DoS cyber attack on a typical web site commonly includes in excess of ten thousand domain calls within sixty seconds, the period of time can be sixty seconds. In another example, if a DoS cyber attack on a typical web site regularly includes in excess of ten thousand domain calls within sixty seconds and the same website regularly handles only ten thousand domain calls to its main domain in one day, then the period of time can be one day.

The global cap engine 228 can include hardware and/or a combination of hardware and programming to establish a global cap of an amount of domain calls to a specific domain by a plurality of users of the load test SaaS application over a period of time. The global cap of an amount of domain calls can be a maximum amount of domain calls. The global cap of an amount of domain calls can be established based on characteristics of the specific domain (e.g., a main domain and/or an auxiliary domain of an application under test). The plurality of users can include a plurality of users that have submitted or will submit a load test request to utilize the load test SaaS application. The plurality can include all of the users or a portion of the users of a load test SaaS application. The characteristics of the specific domain can include the format of the application under test. The format of the application under test can be indicative of the amount of load that the application can tolerate and can, therefore, be used to establish differing global caps for the specific domains of differing application formats. For example, if the application under test is a web site of a popular search engine and the specific domain is the main domain associated with a URL of the home page of that web site, then a relatively larger global cap can be established versus a global cap established for a small internet retailer.

The characteristics of the specific domain can also include an amount of permissible domain calls to a specific domain as determined by a verified user with verified permissions to the domain. For example, a user with a verified identity and verified permissions for a web site of a popular search engine can determine an amount of domain calls permitted from the plurality of users for each of the specific domains.

The user cap modify engine 230 can include hardware and/or a combination of hardware and programming to modify the user specific cap of the amount of domain calls to the specific domain by the specific user over the period of time based on a verification of the specific user. Modifying the user specific cap of the amount of domain calls can include increasing and/or decreasing the established user specific cap of the amount of domain calls to the specific domain by the specific user over the period of time. Modifying the cap can be responsive to periodically or continuously monitoring and identifying changes in a number of user characteristics including the verification of the specific user. Verification of the specific user can include a verification of the identity of the specific user. The identity of the specific user can be verified by, for example, by a telephone conversation with the user, verifying via forms of identification (e.g., driver license, government identification, passport, credit card, social security number, etc.), and verifying via a verified user vouching for the yet unverified user. Once identity verification occurs, the cap of the amount of domain calls to the specific domain by the specific user over the period of time can be increased. The magnitude of the increase can be based on the level of certainty in the verification and/or indications of a likelihood of abuse of the load test SaaS application associated with the verified identity. For example, if the verified identity matches an identity contained in a database of individuals suspected of cyber attacks, then the verification of the identity can lead to no increase in the cap of domain calls or even a decrease. If the verified identity is that of a person who is not suspected of cyber attacks, but also has no known affiliations with the application, then the verification of the identity can lead to a marginal increase in the cap of domain calls. If the verified identity is that of a web security department of a business associated with the application then the verification of the identity can lead to a large increase in the cap of domain calls.

Verification of the specific user can also include a verification of the permissions of the specific user with respect to the application under test and/or its specific domains. Verification of the permissions of the specific user can include contacting an administrator of record for application under test and/or its specific domains and verifying that the user requesting the load test has adequate permissions to make such a request. Verification of the permissions of the specific user can also include verifying that the user requesting the load test has adequate permissions to request a load test of the application under test and/or its specific domains via another verified user already possessing the adequate permissions. Additionally, verification of the permissions of the specific user can include challenging the user to establish permissions. The user can establish their permissions by placing a specified token (e.g., a specific GUID) in the main domain root of the application under test. Modifying the user specific cap based on a verification of permissions of the specific user can include increasing the user specific cap responsive to a verification of the permissions of the specific user. The verification of the permissions can be assigned an expiration date and/or time, past which the accompanying increase in the user specific cap will be eliminated or reduced without renewal of the verification.

The global cap modify engine 232 can include hardware and/or a combination of hardware and programming to modify the global cap of the amount of domain calls to the specific domain by the plurality of users of the load testing SAAS over the period of time based on a characteristic of the specific domain. Modifying the global cap of the amount of domain calls can include increasing and/or decreasing the established global cap of the amount of domain calls to the specific domain by the plurality of users of the load test SAAS application over a period of time. Modifying the global cap can be done in response to periodically or continuously monitoring and identifying characteristics of specific domains.

A characteristic of a specific domain can include the format of an application under test. The format of the application under test can be indicative of the amount of load that the application can tolerate. Therefore, the format of the application under test can be used to modify differing global caps for the specific domains of differing application formats. For example, if the application under test is a website of a popular search engine and the specific domain is a main domain associated with a URL of the home page of that website then the established global cap for the main domain and/or auxiliary domain may be increased to account for the increased load handling capability associated with a search engine format website as opposed to, for example, a small online retailer format website. Modifying the established global cap in response to the application can be performed when a determination of the application format was unavailable when the cap was initially established and, as a result, the web site had a lower global cap established.

A characteristic of a specific domain can also include a load expectation for an application under test. A load expectation of an application under test can be an amount of domain calls that are expected for a specific domain of the application. For example, the application under test can be a popular online retailer that generally experiences millions of domain calls each day to its main domain and/or auxiliary domains. Therefore, the website of the popular online retailer is expected to handle a larger daily load than a small online retailer with similar domains, but that only experiences hundreds of domain calls each day. Modifying the global cap of the amount of domain calls to the specific domain by the plurality of users of the load test SaaS application over the period of time based on a load expectation for an application under test can include increasing the global cap of the amount of domain calls if the specific domain is that of an application expected to regularly experience a heavy load. Modifying the global cap of the amount of domain calls to the specific domain by the plurality of users of the load test SaaS application over the period of time based on a load expectation for an application under test can alternatively include decreasing the global cap of the amount of domain calls if the specific domain is that of an application expected to regularly experience a very light load.

The block engine 234 can include hardware and/or a combination of hardware and programming to block a domain call determined to exceed at least one of the modified user specific cap of the amount of domain calls to the specific domain by the specific user over the period of time and the modified global cap of the amount of domain calls to the specific domain by the plurality of users of the load test SaaS application over the period of time. Blocking can include blocking a request from a user, blocking the execution of a script from the user, and/or blocking a particular domain call of a number of domain calls requested by a user. Blocking can be triggered by tracking of executed domain calls versus modified and/or unmodified established user specific caps and/or global caps and identifying a domain call that will violate those caps. Tracking and identifying can include deducting each executed domain call from the modified and/or unmodified established user specific caps and/or global caps until one and/or both caps are exhausted and then flagging subsequent domain call requests as suspicious activity to be blocked.

Figure 3:
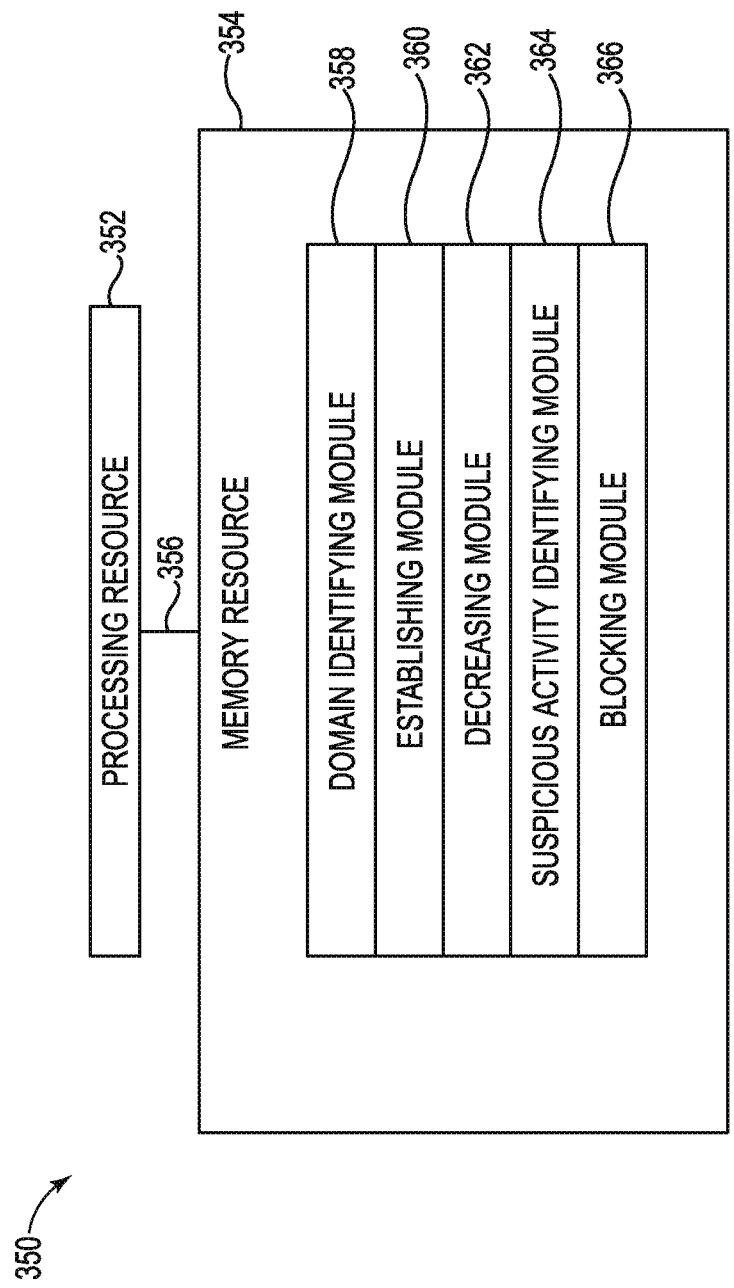
FIG. 3 illustrates a diagram of an example of a computing device according to the present disclosure.

FIG. 3 illustrates a diagram of an example of a computing device 350 according to the present disclosure. The computing device 350 can utilize software, hardware, firmware, and/or logic to perform a number of functions described herein. The computing device 350 can be any combination of hardware and program instructions to share information. The hardware, for example, can include a processing resource 352 and/or a memory resource 354 (e.g., computer-readable medium (CRM), machine readable medium (MRM), database, etc.). A processing resource 352, as used herein, can include any number of processors capable of executing instructions stored by a memory resource 354. The processing resource 352 may be implemented in a single device or distributed across multiple devices. The program instructions (e.g., computer readable instructions (CRI)) can include instructions stored on the memory resource 354 and executable by the processing resource 352 to implement a desired function (e.g., identifying a main domain and a number of auxiliary domains of an application under a load test, establishing a maximum amount of domain calls to the main domain and a maximum amount of domain calls to each of the number of auxiliary domains by a specific user over a period of time, establishing a maximum amount of domain calls to the main domain and a maximum amount of domain calls to each of the number of auxiliary domains by a plurality of users of a load testing service (e.g., a load testing software as a service (SAAS)) over the period of time, decreasing the maximum amount of domain calls to a particular auxiliary domain of the number of auxiliary domains by the specific user over the period of time based on a tracked amount of domain calls to the main domain by the specific user over the period of time to a tracked amount of domain calls to the particular auxiliary domain of the number of auxiliary domains by the specific user over the period of time falling outside of a particular ratio, identifying a domain call that exceeds at least one of the maximum amount of domain calls to the main domain by the specific user over the period of time, the maximum amount of domain calls to each of the number of auxiliary domains by the specific user over the period of time, the maximum amount of domain calls to the main domain by the plurality of users of the load testing service (e.g., a load testing software as a service (SAAS)) over the period of time, and the maximum amount of domain calls to each of the number of auxiliary domains by the plurality of users of the load testing service (e.g., a load testing software as a service (SAAS)) over the period of time as suspicious activity, blocking suspicious activity, etc.).

The memory resource 354 can be in communication with a processing resource 352. A memory resource 354, as used herein, can include any number of memory components capable of storing instructions that can be executed by the processing resource 352. The memory resource 354 can be a non-transitory CRM or MRM. The memory resource 354 may be integrated in a single device or distributed across multiple devices. Further, the memory resource 354 may be fully or partially integrated in the same device as the processing resource 352 or it may be separate but accessible to that device and the processing resource 352. Thus, it is noted that the computing device 350 may be implemented on a participant device (e.g., host), on a server device, on a collection of server devices, and/or a combination of the participant device and the server device.

The memory resource 354 can be in communication with the processing resource 352 via a communication link (e.g., a path) 356. The communication link 356 can be local or remote to a machine (e.g., a computing device) associated with the processing resource 352. Examples of a local communication link 356 can include an electronic bus internal to a machine (e.g., a computing device) where the memory resource 354 is one of volatile, non-volatile, fixed, and/or removable storage medium in communication with the processing resource 352 via the electronic bus.

FIG. 3 includes a number of modules (e.g., domain identifying module 358, establishing module 360, decreasing module 362, suspicious activity module 364, blocking module 366, etc.) that can include CRI that when executed by the processing resource 352 can perform a number of functions. The number of modules can be sub-modules of other modules. For example, the domain identifying module 360 and the decreasing module 362 can be sub-modules and/or contained within the same computing device. In another example, the number of modules can comprise individual modules at separate and distinct locations (e.g., CRM, etc.).

Each of the number of modules can include hardware, logic, software and hardware, but at least can include instructions that when executed by the processing resource 352 can function as a corresponding engine, including those as described herein. For example, the establishing module 360 can include instructions that when executed by the processing resource 352 can function as the user cap engine 226. The decreasing module 362 can include instructions that when executed by the processing resource 352 can function as the user cap modify engine 230 and/or the global cap modify engine 232. The suspicious activity identifying module 364 and/or the block module 366 can include instructions that when executed by the processing resource 352 can function as the block engine 234.

The domain identifying module 358 can include CRI that when executed by the processing resource 352 can identify a main domain and a number of auxiliary domains of an application under test. A main domain of the application under test can include the core domain (e.g., a home page, a most common called domain, a domain associated with the main content of the application, etc.) associated with the application. An application under load test can be a web site that is the subject of a load test and/or a load test request. The main domain of a web site that delivers news content can be the URL that is associated with the home page of the web site. The main domain can additionally include a most-frequently called domain of the web site.

The auxiliary domain of the application under test can include a domain (e.g., advertisements, content served separately from the main domain, javascripts, etc.) other than the main domain. The number of auxiliary domains, for example, can be domains that are called by browsers surfing the application under test for javascripts or images. The auxiliary domain can include html, images, and other resources which are fed in from separate domains to be displayed on the home page of the web site application under test. The number of auxiliary domains can include a number of files, served by the website, from at least one of a content delivery network, an advertiser, and a script hosting provider residing on a separate domain from the main domain.

Identifying a main domain and a number of auxiliary domains of an application under test can include identifying the main domain and/or an auxiliary domain of the application based on a corresponding categorization by the user requesting the load test. Alternatively, Identifying a main domain and a number of auxiliary domains of an application under test can include identifying the main domain and/or an auxiliary domain of the application via a static analysis of a load test plan included in the request from the user. The static analysis can include identifying a domain with a greatest amount of requested calls in a load test plan as the main domain and other domains as the number of auxiliary domains. Identifying a main domain and a number of auxiliary domains of an application under test can also include periodically identifying as the main domain any domain of the application under test receiving the greatest amount of domain calls during a run of the load test and identifying the other domains as the number of auxiliary domains.

The establishing module 360 can include CRI that when executed by the processing resource 352 can establish a maximum amount of domain calls to the main domain and a maximum amount of domain calls to each of the number of auxiliary domains by a specific user over a period of time (e.g., establish a user specific cap) and/or establish a maximum amount of domain calls to the main domain and a maximum amount of domain calls to each of the number of auxiliary domains by a plurality of users of a load test SaaS application over the period of time (e.g., establish a global cap). Establishing a maximum amount of domain calls to the main domain and a maximum amount of domain calls to each of the number of auxiliary domains by a specific user over a period of time can include establishing a maximum amount of domain calls to the main domain and a maximum amount of domain calls to each of the number of auxiliary domains by a specific user over a period of time based on a verification of the specific user. Establishing a maximum amount of domain calls to the main domain and a maximum amount of domain calls to each of the number of auxiliary domains by a plurality of users of a load test SaaS application over the period of time can include establishing a maximum amount of domain calls to the main domain and a maximum amount of domain calls to each of the number of auxiliary domains by a plurality of users of a load test SaaS application over the period of time based on characteristics of the domain.

The decreasing module 362 can include CRI that when executed by the processing resource 352 can decrease the maximum amount of domain calls to a particular auxiliary domain of the number of auxiliary domains by the specific user over the period of time based on a tracked amount of domain calls to the main domain by the specific user over the period of time to a tracked amount of domain calls to the particular auxiliary domain of the number of auxiliary domains by the specific user over the period of time falling outside of a particular ratio. Falling outside of a particular ratio can include exceeding the ratio, falling below the ratio, and/or rapidly deviating from the ratio. The ratio can be a single ratio, a range of ratios, a permissive rate of change over time from a ratio and/or range of ratios. The particular ratio can be a predetermined ratio that is associated with a typical load test run and/or with an approved load test plan for the particular application under test. For example, the predetermined ratio can be one main domain call to every five auxiliary domain calls. The particular ratio can be based on the format of the application. For example, if the application is a web site the particular ratio can be based on the format of the website. The format of the website can indicate an expected ratio of main domain calls to auxiliary domain calls. For example, if the typical ratio is one main domain (e.g., home page URL) call to every five auxiliary domain (e.g., banner advertisements) calls for a news delivery web site format then that ratio can be used as the particular ratio for similar websites. However, if the application is a web site with a search engine format including a main domain displaying search results and auxiliary domains displaying sponsored advertisements as top search results then a different ratio (e.g., one main domain call to ten auxiliary domain calls) can be the particular ratio since the auxiliary domains are much more likely to be regularly selected.

The decreasing module 362 can also include CRI that when executed by the processing resource 352 can modify established maximum amount of domain calls to the main domain and a maximum amount of domain calls to each of the number of auxiliary domains by a specific user over a period of time based on a verification of the specific user and/or establish a maximum amount of domain calls to the main domain and a maximum amount of domain calls to each of the number of auxiliary domains by a plurality of users of the load test SaaS application over the period of time based on characteristics of the domain.

The suspicious activity identifying module 364 can include CRI that when executed by the processing resource 352 can identify a domain call that exceeds at least one of the maximum amount of domain calls to the main domain by the specific user over the period of time, the maximum amount of domain calls to each of the number of auxiliary domains by the specific user over the period of time, the maximum amount of domain calls to the main domain by the plurality of users of the load test SaaS application over the period of time, and the maximum amount of domain calls to each of the number of auxiliary domains by the plurality of users of the load test SaaS application over the period of time as suspicious activity. When tracked amount of domain calls to the main domain by the specific user over the period of time to a tracked amount of domain calls to the particular auxiliary domain of the number of auxiliary domains by the specific user over the period of time fall outside of a particular ratio, domain call requests that further exasperate the difference can also be identified as suspicious activity.

The blocking module 366 can include CRI that when executed by the processing resource 352 can block the suspicious activity. Blocking can include blocking a request from a user, blocking the execution of a script from the user, and/or blocking a particular domain call of a number of domain calls requested by a user. Blocking can be triggered by tracking of executed domain calls versus modified and/or unmodified established user specific and/or global maximums and identifying a domain call that will violate those maximums as suspicious activity.

Figure 4:
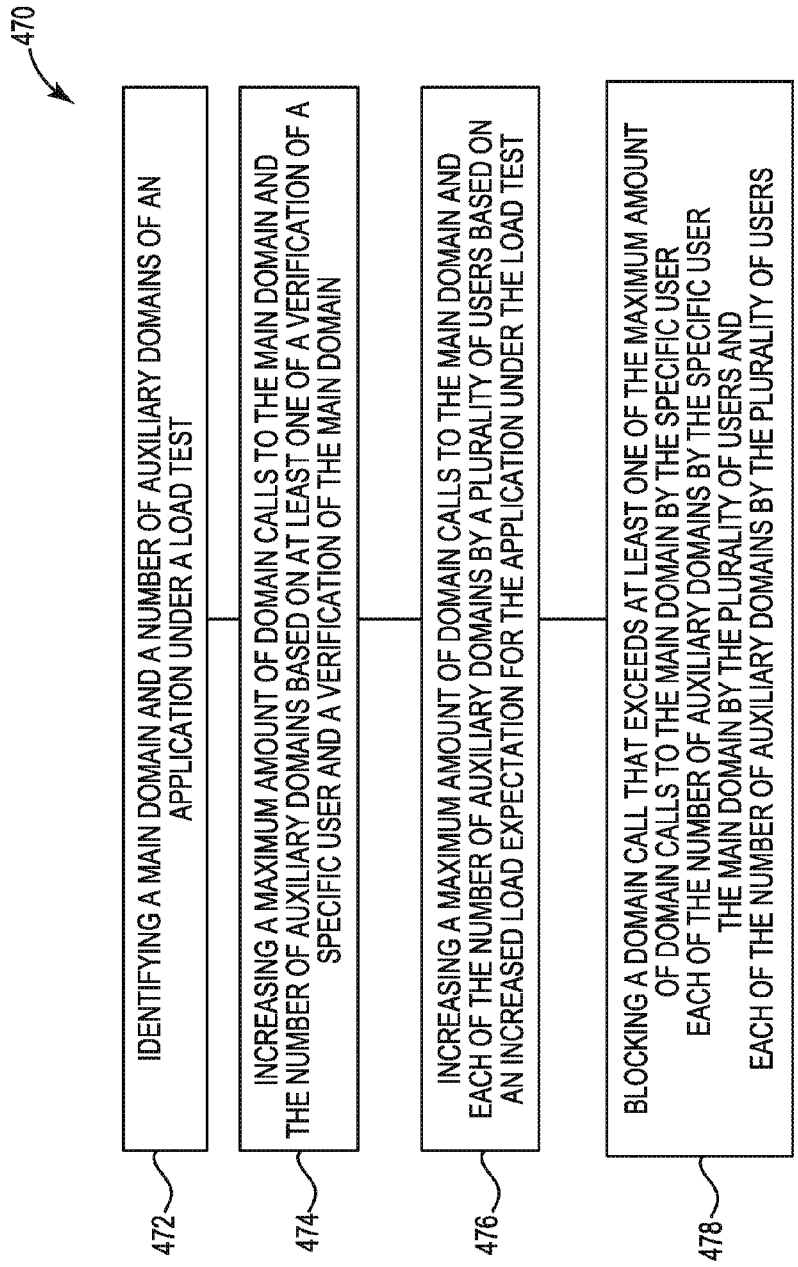
FIG. 4 is a flow chart of an example of a method 470 for identifying suspicious activity in utilizing a load testing service according to the present disclosure.

FIG. 4 is a flow chart of an example of a method 470 for identifying suspicious activity in utilizing a load testing service (e.g., load testing software as a service (SAAS)) according to the present disclosure. Method 470 can be performed by a computing device (e.g., computing device 350, previously described in connection with FIG. 3), for instance.

At 472 the method 470 can include identifying a main domain and a number of auxiliary domains of an application under a load test. Identifying the main domain and the number of auxiliary domains of the application under the load test can include analyzing a load test request and identifying a domain with a greatest amount of requested calls as the main domain and other domains as the number of auxiliary domains (e.g., static analysis of the load test plan). Identifying the main domain and the number of auxiliary domains of the application under the load test can also include periodically identifying as the main domain a domain of the application under test receiving the greatest amount of requested calls during a run of the load test and other domains as the number of auxiliary domains (e.g., dynamic analysis during runtime of the requested load test)

At 474 the method 470 can include increasing a maximum amount of domain calls to the main domain and a maximum amount of domain calls to each of the number of auxiliary domains by a specific user over a period of time based on at least one of a verification of the specific user and a verification of the main domain. A verification of the specific user can include a verification of the identity of the specific user and/or a verification of that user's permissions with regard to the application. A verification of the main domain can include challenging the specific user to place a token in the main domain root and then confirming that the token was placed.

At 476 the method 470 can include increasing a maximum amount of domain calls to the main domain and a maximum amount of domain calls to each of the number of auxiliary domains by a plurality of users over the period of time based on an increased load expectation for the application under the load test. The load expectation of an application under test can include an amount of domain calls that are expected for a specific domain of the application.

At 478 the method 470 can include blocking a domain call that exceeds, over the period of time, at least one of the maximum amount of domain calls to the main domain by the specific user, the maximum amount of domain calls to each of the number of auxiliary domains by the specific user, the maximum amount of domain calls to the main domain by the plurality of users, and the maximum amount of domain calls to each of the number of auxiliary domains by the plurality of users.

In the detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be used and the process, electrical, and/or structural changes may be made without departing from the scope of the present disclosure.

In addition, the proportion and the relative scale of the elements provided in the figures are intended to illustrate the examples of the present disclosure, and should not be taken in a limiting sense. As used herein, the designators "N", particularly with respect to reference numerals in the drawings, indicate that a number of the particular feature so designated can be included with a number of examples of the present disclosure. As used herein, "a" or "a number of" something can refer to one or more such things.

What is claimed:

1. A system for identifying suspicious activity in utilizing a load testing service, comprising:
    a user cap engine to establish a cap of an amount of domain calls to a specific domain by a specific user of the load testing service over a period of time;
    a global cap engine to establish a cap of a number of domain calls to the specific domain by a plurality of users of the load testing service over the period of time;
    a user cap modify engine to modify the cap of the amount of domain calls by the specific user based on a verification of the specific user;
    a global cap modify engine to modify the cap of the amount of domain calls by the plurality of users based on a characteristic of the domain; and
    a block engine to block a domain call determined to exceed at least one of the modified cap of the amount of domain calls by the specific user and the modified cap of the amount of domain calls by the plurality of users.

2. The system of claim 1, wherein the user cap engine establishes the cap of the amount of domain calls to the specific domain by the specific user based on an account history of the specific user.

3. The system of claim 2, wherein the user cap engine establishes relatively lesser cap of the amount of domain calls to the specific domain by the specific user versus another user if the account history of the specific user includes suspicious activity in a previous load test run.

4. The system of claim 3, wherein the suspicious activity includes the specific user having requested an amount of domain calls in excess of a cap associated with the previous load test run.

5. The system of claim 2, wherein the user cap engine establishes a relatively greater cap of the amount of domain calls to the specific domain by the specific user versus another user if the account history of the specific user includes a previous load test run without any suspicious activity.

6. The system of claim 1, including the user cap modify engine to modify the cap of the amount of domain calls to the specific domain by the specific user based on the verification of the specific user, wherein the verification of the specific user includes a successful verification of a specific user identity.

7. The system of claim 1, including the user cap modify engine to modify the cap of the amount of domain calls to the specific domain by the specific user based on the verification of the specific user, wherein the verification of the specific user includes a successful verification of permissions of the specific user.

8. A method for identifying suspicious activity in utilizing a load testing service, comprising:
   identifying a main domain and a number of auxiliary domains of an application under a load test;
   increasing a maximum amount of domain calls to the main domain and a maximum amount of domain calls to each of the number of auxiliary domains by a specific user over a period of time based on at least one of a verification of the specific user and a verification of the main domain;
   increasing a maximum amount of domain calls to the main domain and a maximum amount of domain calls to each of the number of auxiliary domains by a plurality of users over the period of time based on an increased load expectation for the application under the load test; and
   blocking a domain call that exceeds, over the period of time, at least one of the maximum amount of domain calls to:
   the main domain by the specific user,
   each of the number of auxiliary domains by the specific user,
   the main domain by the plurality of users, and
   each of the number of auxiliary domains by the plurality of users.

9. The method of claim 8, wherein identifying the main domain and the number of auxiliary domains includes analyzing a request associated with the load test and identifying a domain with a greatest amount of requested calls as the main domain and other domains as the number of auxiliary domains.

10. The method of claim 8, wherein identifying the main domain and the number of auxiliary domains includes periodically identifying as the main domain a domain of the application under test receiving the greatest amount of requested calls during a run of the load test and other domains as the number of auxiliary domains.

11. The method of claim 8, wherein the verification of the main domain includes challenging the specific user to place a token in the main domain root and confirming that the token was placed.

12. A non-transitory computer readable medium storing instructions executable by a processing resource to cause a computer to:
   identify a main domain and a number of auxiliary domains of an application under a load test;
   establish a maximum amount of domain calls to the main domain and a maximum amount of domain calls to each of the number of auxiliary domains by a specific user over a period of time;
   establish a maximum amount of domain calls to the main domain and a maximum amount of domain calls to each of the number of auxiliary domains by a plurality of users of a load testing service over the period of time;
   decrease the maximum amount of domain calls to a particular auxiliary domain of the number of auxiliary domains by the specific user based on a tracked amount of domain calls to the main domain by the specific user over the period of time to a tracked amount of domain calls to the particular auxiliary domain of the number of auxiliary domains by the specific user over the period of time falling outside of a particular ratio;
   identify as suspicious activity a domain call that exceeds at least one of the maximum amount of domain calls to:
   the main domain by the specific user,
   each of the number of auxiliary domains by the specific user,
   the main domain by the plurality of users of the load testing service, and
   each of the number of auxiliary domains by the plurality of users of the load testing service; and
   block the suspicious activity.

13. The medium of claim 12, wherein the application under the load test is a web site.

14. The medium of claim 13, wherein the main domain includes a most-frequently called domain of the web site and the number of auxiliary domains include a number of files, served by the website, from at least one of a content delivery network, an advertiser, and a script hosting provider residing on a separate domain from the main domain.

15. The medium of claim 13, wherein the particular ratio is based on a format of the web site.

* * * * *